United States Patent [19]
Sano et al.

[11] Patent Number: 6,034,188
[45] Date of Patent: *Mar. 7, 2000

[54] PROCESS FOR PREPARING POLYOLEFINS

[75] Inventors: Akira Sano; Hiroyuki Shimizu, both of Tokyo; Kazuo Matsuura, Yokohama, all of Japan

[73] Assignee: Nippon Oil Company, Limited, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/579,893

[22] Filed: Dec. 28, 1995

Related U.S. Application Data

[63] Continuation of application No. 08/230,976, Apr. 21, 1994, abandoned.

[30] Foreign Application Priority Data

Apr. 26, 1993 [JP] Japan ..................................... 5-132271

[51] Int. Cl.⁷ ....................................................... C08F 4/16
[52] U.S. Cl. ...................................... 526/124.6; 526/125.3
[58] Field of Search ............................... 526/124.6, 125.3

[56] References Cited

U.S. PATENT DOCUMENTS

| | | | |
|---|---|---|---|
| 4,451,688 | 5/1984 | Kuroda et al. | 526/125 |
| 4,952,649 | 8/1990 | Kioka et al. | 526/125 |
| 5,075,396 | 12/1991 | Kashiwa et al. | 526/125 |

FOREIGN PATENT DOCUMENTS

| | | |
|---|---|---|
| 0413469 | 2/1991 | European Pat. Off. . |
| 413469 | 2/1991 | European Pat. Off. . |
| 0447079 | 9/1991 | European Pat. Off. . |
| 447079 | 9/1991 | European Pat. Off. . |
| 447079 | 9/1991 | Japan . |

*Primary Examiner*—David W. Wu
*Assistant Examiner*—Ling-Siu Choi
*Attorney, Agent, or Firm*—Dilworth & Barrese

[57] ABSTRACT

An olefin polymerization is conducted in the presence of a catalyst comprising a solid catalyst component and an organometallic compound, said solid catalyst component being prepared by reacting the following components [I], [II] and [III] with one another:

[I] a reaction product obtained by reacting the following components (1), (2) and (3) with one another:

(1) a silicon oxide and/or an aluminum oxide;

(2) a reaction product obtained by the reaction of a magnesium halide and a compound represented by the general formula $Me(OR)_n X_{z-n}$ where Me represents an element of Groups I to IV in the Periodic Table, z represents the valence of the element Me, n is $0 < n \leq z$, X is a halogen atom and R is a hydrocarbon group having 1 to 20 carbon atoms; and (3) a titanium compound represented by the general formula $Ti(OR^1)_m X_{4-m}$; where $R^1$ is a hydrocarbon group having 1 to 20 carbon atoms, X is a halogen atom and m is $0 \leq m \leq 4$;

an organoaluminum compound represented by the general formula $Al(OR^3)_p R^4_q X_{3-(p+1)}$ where $R^3$ and $R^4$, which may be the same or different, are each independently a hydrocarbon group having 1 to 24 carbon atoms, X is a halogen atom or a hydrogen atom, p and q are $0 \leq p < 3$ and $0 \leq q \leq 3$, respectively, provided $0 < p+q \leq 3$; and a silicon compound having at least one Si-N-C bond.

24 Claims, No Drawings

PROCESS FOR PREPARING POLYOLEFINS

This is a continuation, of application Ser. No. 08/230,976 filed on Apr. 21, 1994 now abandoned.

BACKGROUND OF THE INVENTION

The present invention relates to a novel process for preparing polyolefins. More particularly, the present invention relates to a process for preparing polyolefins of good particles having a large average particle diameter and a narrow molecular weight distribution, which process is capable of greatly increasing the polymer yield per solid and that per transition metal, thereby permitting the omission of the step of removing catalyst remaining in the resulting polymer, further capable of increasing the bulk density of the polymer and decreasing a fine particulate portion of the polymer.

Heretofore, in this technical field there have been known many catalysts comprising inorganic magnesium solids as carriers such as magnesium halide, magnesium oxide and magnesium hydroxide and a transition metal compound such as a titanium compound or a vanadium compound supported on the carriers. However, the polyolefins obtained in the prior art are generally low in bulk density, relatively small in average particle diameter and generally wide in particle size distribution so contain a large proportion of fine particles. Besides, when these powdery polymers are subjected to forming, there arise problems such as dusting and lowering of the forming, efficiency. For the reason, improvement has keenly been desired from the standpoint of productivity and polymer handling. Further, still further improvements are considered necessary in order to satisfy the recent keen desire for omitting the pelletizing step and using a powdery polymer directly in a processing machine.

The present inventors have previously found out novel catalyst components with the above drawbacks remedied and already filed patent applications thereon (see JP1-11651B, 1-12289B, 60-149605A, 62-32105A and 62-207306A). The use of these catalyts component can afford a polymer having a high bulk density and a large average particle diameter. However, a further improvement has been considered necessary for omitting the pelletizing step and using a powdery polymer directly in a processing machine.

Also, there are various fields in which a polyolefin having a narrow molecular weight distribution is required. For example, an injection-grade polyolefin requires a narrow molecular weight to improve the impact strength and a film-grade polyolefin to improve the strength, transparency, anti-blocking property and heat-sealability.

The present inventors have also found out catalyst components having such properties and filed patent applications (see JP3-64306A, 3-153707A, 3-185004A, 3-252407A and 2-179485A). These catalyst components can each afford a polymer having a narrow molecular weight has still been required.

It is the object of the present invention to remedy the above-mentioned drawbacks and obtain in extremely high activity a polymer having a high bulk density, a narrow particle size distribution, an extremely proportion of fine particles, and superior in fluidity.

SUMMARY OF THE INVENTION

The present invention resides in a process of preparing a polyolefin by polymerizing an olefin or olefins in the presence of a catalyst comprising a solid catalyst component and an organometallic compound, the said solid catalyst component being prepared by reacting the following components [I], [II] and [III] with one another:

[I] a reaction product obtained by reacting the following components (1), (2) and (3) with one another in the presence of a compound represented by the general formula $R^2OH$ where $R^2$ is a hydrocarbon group having 1 to 20 carbon atoms:

(1) a silicon oxide and/or an aluminum oxide (2) a reaction product obtained by the reaction of a magnesium halide and a compound represented by the general formula $Me(OR)_nX_{z-n}$ where Me represents an element of Groups I to IV in the Periodic Table, z represents the valence of the element Me, n is $0<n\leq z$, X is a halogen atom and R is a hydrocarbon group having 1 to 20 carbon atoms, and (3) a titanium compound represented by the general formula $Ti(OR^1)_mX_{4-m}$; where $R^1$ is a hydrocarbon group having 1 to 20 carbon atoms, X is a halogen atom and m is $0\leq m\leq 4$.

[II] an organoaluminum compound represented by the general formula $Al(OR^3)_pR^4_qX_{3-(p+q)}$ where $R^3$ and $R^4$, which may be the same or different, are each independently a hydrocarbon group having 1 to 24 carbon atoms, X is a halogen atom or a hydrogen atom, p and q are $0\leq p<3$ and $0\leq q\leq 3$, respectively, provided $0\leq p+q\leq 3$; and

[III] a silicon compound having at least one Si—N—C bond.

In the above formulae, the term "hydrocarbon group" means a hydrocarbon group which may have an inert substituent.

In the first aspect of the present invention there is provided the above process wherein the solid catalyst component is a reaction product obtained by reacting the components [I], [II] and [III] simultaneously.

In the second aspect of the present invention there is provided the above process wherein the solid catalyst component is a reaction product obtained by the reaction of the components [I] and [II] and subsequent reaction of the resulting reaction product with the component [III].

In the third aspect of the present invention there is provided the above process wherein the solid catalyst component is a reaction product obtained by the reaction of the components [I] and [III] and subsequent reaction of the resulting reaction product with the component [II].

In the fourth aspect of the present invention there is provided the above process wherein the solid catalyst component is a reaction product obtained by reacting the component [I] with the reaction product of the components [II] and [III].

By the process of the present invention there is obtained, in extremely high activity, a polyolefin having a relatively large average particle diameter, a narrow particle size distribution and a reduced proportion of fine particles. Besides, the bulk density and free fluidity of the polyolefin are high. These characteristics are very advantageous to the polymerization operation. Further, the polyolefin prepared by the process of the present invention can be subjected to forming not only as pellets but also in the form of powder, without causing any trouble.

It is also a characteristic feature of the present invention that the polymer obtained using the catalyst specified in the present invention is extremely narrow in its molecular weight distribution and small in the amount thereof extracted in hexane, and that the amount of low grade polymers by-produced is very small. Therefore, when film is formed using the polyolefin of a narrow molecular weight distribution prepared by the process of the present invention, it has a lot of merits, for example, high transparency, superior anti-blocking property and heatsealability.

DETAILED DESCRIPTION OF THE INVENTION

The present invention will be described concretely hereinunder.

The catalyst used in the polyolefin preparing process of the present invention comprises a solid catalyst component and an organometallic compound, the said solid catalyst component being prepared by reacting the following components [I], [II] and [III] with one another:

[I] a reaction product obtained by reacting the following components (1), (2) and (3) with one another in the presence of a compound represented by the general formula $R^2OH$ where $R^2$ is a hydrocarbon group having 1 to 20 carbon atoms:

(1) a silicon oxide and/or an aluminum oxide (2) a reaction product obtained by the reaction of a magnesium halide and a compound represented by the general formula $Me(OR)_nX_{z-n}$ where Me represents an element of Groups I to IV in the Periodic Table, z represents the valence of the element Me, n is $0<n\leq z$, X is a halogen atom and R is a hydrocarbon group having 1 to 20 carbon atoms, and (3) a titanium compound represented by the general formula $Ti(OR^1)_mX_{4-m}$; where $R^1$ is a hydrocarbon group having 1 to 20 carbon atoms, X is a halogen atom and m is $0\leq m\leq 4$.

[II] an organoaluminum compound represented by the general formula $Al(OR^3)_pR^4_qX_{3-(p+q)}$ where $R^3$ and $R^4$, which may be the same or different, are each independently a hydrocarbon group having 1 to 24 carbon atoms, X is a halogen atom or a hydrogen atom, p and q are $0\leq p<3$ and $0\leq q\leq 3$, respectively, provided $0<p+q\leq 3$; and

[III] a silicon compound having at least one Si—N—C bond.

<1> Solid Catalyst Component

1. Component [I]

(1) The silicon oxide used in the present invention is silica or a double oxide of silicon and at least one another metal selected from Groups I–VIII of the Periodic Table.

The aluminum oxide used in the present invention is alumina or a double oxide of aluminum and at least one another metal selected from Groups I–VIII in the Periodic Table.

As typical examples of the double oxide of silicon or aluminum and at least one another metal selected from Groups I–VIII in the Periodic Table there are mentioned various natural and synthetic double oxides such as $Al_2O_3.MgO$, $Al_2O_3.CaO$, $Al_2O_3.SiO_2$, $Al_2O_3.MgO.CaO$, $Al_2O_3.MgO.SiO_2$, $Al_2O_3.CuO$, $Al_2O_3.Fe_2O_3$, $Al_2O_3.NiO$, and $SiO_2.MgO$. It is to be noted that these formulae are not molecular formulae but represent only compositions and that the structure and component ratio of the double oxide used in the present invention are not specially limited thereby. It goes without saying that the silicon oxide and/or aluminum oxide used in the present invention may have a small amount of water absorbed therein or may contain a small amount of impurities.

Although the properties of the silicon oxide and/or aluminum oxide used in the present invention are not specially limited so far as the objects of the present invention are not adversely affected thereby, a silica having a particle diameter of 1 to 200 μm, an average pore volume of greater than 0.3 ml/g and a surface area of greater than 50 m²/g is preferred. Also, it is preferably calcined at 200–800° C. by a conventional method prior to use.

(2) As the magnesium halide there is used a substantially anhydrous one. Examples are magnesium dihalides such as magnesium fluoride, magnesium chloride, magnesium bromide, and magnesium iodide, with magnesium chloride being particularly preferred.

[II] an organoaluminum compound represented by the general formula $Al(OR^3)_pR^4_qX_{3-(p+q)}$ where $R^3$ and $R^4$, which may be the same or different, are each independently a hydrocarbon group having 1 to 24 carbon atoms, X is a halogen atom or a hydrogen atom, p and q are $0\leq p<3$ and $0\leq q\leq 3$, respectively, provided $0<p+q\leq 3$; and

[III] a silicon compound having at least one Si—N—C bond.

These magnesium halides may have been treated with electron donors such as alcohols, esters, ketones, carboxylic acids, ethers, amines, and phosphines.

As examples of the compound of the general formula $Me(OR^1)_nX_{z-n}$ used in the present invention wherein Me is preferably an element of Groups I to III or IV b in the Periodic Table, and $R^1$ is preferably alkyl, aryl, or aralkyl having 1–8 carbon atoms, there are mentioned compounds represented by $NaOR^1$, $Mg(OR^1)_2$, $Mg(OR^1)X$, $Ca(OR^1)_2$, $Zn(OR^1)_2$, $Cd(OR^1)_2$, $B(OR^1)_3$, $Al(OR^1)_3$, $Al(OR^1)_2$, X, $Al(OR^1)X_2$, $Si(OR^1)_4$, $Si(OR^1)_3X$, $Si(OR^1)_2X_2$, $Si(OR^1)X_3$, and $sn(OR^1)_4$.

More concrete and preferred examples are $Mg(OC_2H_5)_2$, $Mg(OC_2H_5)Cl$, $Al(OCH_3)_3$, $Al(OC_2H_5)_3$, $Al(On-C_3H_7)_3$, $Al(Oi-C_3H_7)_3$, $Al(On-C_4H_9)_3$, $Al(Osec-C_4H_9)_3$, $Al(Ot-C_4H_9)_3$, $Al(OCH_3)_2Cl$, $Al(OC_2H_5)_2Cl$, $Al(OC_2H_5)Cl_2$, $Al(Oi-C_3H_7)_2Cl$, $Al(Oi-C_3H_7)Cl_2$, $Al(OC_6H_5)_3$, $Al(OC_6H_5)_2Cl$, $Al(OC_6H_5)Cl_2$, $Al(OC_6H_4CH_3)_3$, $Al(OC_6H_4CH_3)_2Cl$, $Al(OC_6H_4CH_3)Cl_2$, $Al(OCH_2C_6H_5)_3$, $Si(OC_2H_5)_4$, $Si(OC_2H_5)_3Cl$, $Si(OC_2H_5)_2Cl_2$, $Si(OC_2H_5)Cl_3$, $Si(OC_6H_5)_4$, $Si(OC_6H_5)_3Cl$, $Si(OC^6H_5)_2Cl_2$, $Si(OC_6H_5)Cl_3$, $Si(OCH_2C_6H_5)_4$. It is preferable that the reaction ratio of the compound of the general formula $Me(OR^1)_nX_{z-n}$ to the magnesium halide is in the range of 0.01 to 10, preferably 0.1 to 5 in terms of Me/Mg (molar ratio).

The method of reaction between the magnesium halide and the compound of the general formula $Me(OR^1)_nX_{z-n}$ is not specially limited. There may be adopted a method in which both components are copulverized using, for example, ball mill, vibration mill, rod mill, or impact mill, at a temperature of 0° to 200° C., for 30 minutes to 50 hours, in the presence or absence of an inert hydrocarbon solvent. Or there may be adopted a method in which both components are mixed and reacted together under heating at a temperature of 20° to 400° C., preferably 50° to 300° C., for 5 minutes to 10 hours, in an organic solvent selected from inert hydrocarbons, alcohols, phenols, ethers, ketones, esters, nitrites and mixtures thereof, and thereafter the solvent is evaporated off. The method of co-pulverizing the two is preferred in the present invention.

(3) As example of the titanium compound of the general formula $Ti(OR^1)_mX_{4-m}$ used in the present invention wherein $R^1$ is a hydrocarbon group having 1 to 20, preferably 1 to 12, carbon atoms such as an alkyl, aryl or aralkyl group, X is a halogen atom such as chlorine, bromine, iodine or fluorine, and m is $0\leq m\leq 4$. As the above alkyl, there are mentioned methyl, ethyl, propyl, isopropyl, butyl, sec-butyl, tert-butyl, pentyl, octyl or decyl, as the aryl there are mentioned phenyl or tolyl and as the aralkyl there are mentioned benzyl. Examples are titanium tetrahalides (e.g.

titanium tetrachloride, titanium tetrabromide, titanium tetraiodide), monomethoxytrichlorotitanium, dimethoxydichlorotitanium, trimethoxymonochlorotitanium, monoethoxytrichlorotitanium, monoethoxytrifluorotitanium, monomethoxytrifluorotitanium, diethoxydifluorotitanium, diethoxydichlorotitanium, diethoxydibromotitanium, triethoxyfluorotitanium, triethoxychlorotitanium, tetraethoxytitanium, monopropoxytrichlorotitanium, dipropoxydichlorotitanium, diisopropoxydichlorotitanium, diisopropoxydibromotitanium, tripropoxyfluorotitanium, tripropoxychlorotitanium, tetra-n-propoxytitanium, tetraisopropoxytitanium, monobutoxytrichlorotitanium, monoisobutoxytrichlorotitanium, dibutoxydichlorotitanium, diisopropoxydichlorotitanium, tributoxyfluorotitanium, tributoxychlorotitanium, triisobutoxychlorotitanium, tetra-n-butoxytitanium, tetra-isobutoxytitanium, tetra-sec-butoxytitanium, tetra-tert-butoxytitanium, monopentoxytrichlorotitanium, dipentoxydichlorotitanium, tripentoxymonochlorotitanium, tetra-n-pentyloxytitanium, tetracyclopentyloxytitanium, monooctyloxytrichlorotitanium, dioctyloxydichlorotitanium, trioctyloxymonochlorotitanium, tetra-n-hexyloxytitanium, tetracyclohexyloxytitanium, tetra-n-heptyloxytitanium, tetra-n-octyloxytitanium, tetra-2-ethylhexyloxytitanium, mono-2-ethylhexyloxytrichlorotitanium, di-2-ethylhexyloxydichlorotitanium, tri-2-ethylhexyloxymonochlorotitanium, tetranonyloxytitanium, tetradecyloxytitanium, tetraisobornyloxytitanium, tetraoleyloxytitanium, tetraallyloxytitanium, tetrabenzyloxytitanium, tetrabenzhydryloxytitanium, monophenoxytrichlorotitanium, diphenoxydichlorotitanium, triphenoxychlorotitanium, tri-o-xylenoxychlorotitanium, tetraphenoxytitanium, tetra-o-methylphenoxytitanium, tetra-m-methylphenoxytitanium tetra-1-naphthyloxytitanium and tetra-2-naphthyloxytitanium and mixtures thereof. Preferable titanium compounds are titanium tetrachloride, monoethoxytrichlorotitanium, diethoxydichlorotitanium, monobutoxytrichlorotitanium, dibutoxydichlorotitanium, tetraethoxytitanium, tetraisopropoxytitanium, tetra-n-butoxytitanium, tetra-n-hexyloxytitanium, tetra-n-octyloxytitanium, and tetra-2-ethylhexyloxytitanium.

(4) The component [I] of the present invention is obtained by reacting (1) a silicon oxide and/or an aluminum oxide (referred to s component [I]-(1)), (2) a reaction product obtained by the reaction of a magnesium halide and a compound represented by the general formula Me(OR)$_n$X$_{z-n}$ (referred to as component [I]-(2)) and (3) a titanium compound represented by the general formula Ti(OR$^1$)$_m$X$_{4-m}$ (referred to as component [I]-(3)) with one another in the presence of a compound represented by the general formula R$^2$OH.

Compounds of the general formula R$^2$OH are those wherein R$^2$ is a hydrocarbon group having 6 to 20, preferably 6 to 12, carbon atoms. Preferred examples of such hydrocarbon radical are alkyl, alkenyl, aryl and aralkyl. Particularly preferred are those having a branch structure.

Those having such an element as oxygen, nitrogen, sulfur or chlorine may also be used. As example of the compound of the general formula ROH there are mentioned 1-hexanol, 2-methyl-1-pentanol, 4-methyl-1-pentanol, 4-methyl-2-pentanol, 2-ethyl-1-butanol, 1-heptanol, 2-pentanol, 3-heptanol, 4-heptanol, 2,4-dimethyl-3-pentanol, 1-octanol, 2-octanol, 2-ethyl-1-hexanol, 3,5-dimethyl-1-hexanol, 2,2, 4-trimethyl-1-pentanol, 1-nonanol, 5-nonanol, 3,5-dimethyl-4-heptanol, 2,6-dimethyl-4-heptanol, 3,5,5-trimethyl-1-hexanol, 1-decanol, 1-undecanol, 1-dodecanol, 2,6,8-trimethyl-4-nonanol, 1-tridecanol, 1-pentadecanol, 1-hexadecanol, 1-heptadecanol, 1-octadecanol, 1-nonadecanol, 1-eicosanol, phenol, chlorophenol, benzyl alcohol, methyl cellosolve, and mixtures thereof. Particularly, 2-methyl-1-pentanol, 4-methyl-1-pentanol, 4-methyl-2-pentanol, 2-ethyl-1-butanol, 2,4-dimethyl-3-pentanol, 2-ethyl-1-hexanol, 3,5-dimethyl-1-hexanol, 2,2,4-trimethyl-1-pentanol, 3,5-dimethyl-4-heptanol, 2,6-dimethyl-4-heptanol, and 3,5,5-trimethyl-1-hexanol are preferred.

Of course, various denatured alcohols available commercially as industrial alcohols such as methanol-denatured ethanol and hexane-denatured ethanol are also employable.

How to react the components [I]-(1) to [I]-(3) in the preparation of component [I] is not specially limited if only the reaction is conducted in the presence of a compound of the general formula R$^2$OH. These components may be reacted with one another in any of the following orders:

(A) Components [I]-(1) to [I]-(3) are contacted at a time.
(B) Components [I]-(1) and [I]-(2) are contacted together, followed by contact with component [I]-(3).
(C) Components [I]-(1) and [I]-(3) are contacted together, followed by contact with component [I]-(2).
(D) Components [I]-(2) and [I]-(3) are contacted together, followed by contact with component [I]-(1).

The above method (D) is preferred. More preferably, components [I]-(2) and [I]-(3) are dissolved and contacted together in advance, using a compound of the general formula R$^2$OH as a solvent, followed by contact with component [I]-(1). In what order the components [I]-(2) and [I]-(3) should be dissolved in the compound of the general formula R$^2$OH is not specially limited. Both may be dissolved at a time, or one may precedes the other.

There also may be adopted the following method. Component [I]-(2) and/or component [I]-(3) are (is) dissolved beforehand in a compound smaller in the number of carbon atom than the compound of the general formula R$^2$OH, namely a compound having 1 to 5 carbon atoms, which is a so-called lower alcohol, and thereafter the components to be reacted are contacted together using the lower alcohol solution containing the component [I]-(2) and/or the component [I]-(3) and in the presence of the compound of the general formula R$^2$OH having a higher carbon atoms of 6 to 20.

According to a preferred method of contacting the components [I]-(1) to [I]-(3), these components are contacted, mixed and reacted in accordance with any of the foregoing contacting orders at a temperature of 20–300° C., preferably 30–150° C., for 1 minute to 48 hours, preferably 30 minutes to 5 hours, in the presence of a compound of the general formula R$^2$OH, and thereafter the compound of the general formula R$^2$OH is removed by the reduction of pressure and/or heating.

As to the reaction ratio of the components, it is desirable to react the components [I]-(1) and [I]-(2) in such a manner that the magnesium content in the component [I]-(2) becomes 0.01 to 20 mmol, preferably 0.1 to 10 mmol, more preferably 0.2 to 4.0 mmol, per gram of the component [I]-(1). As to the components [I]-(1) and [I]-(3), it is preferable that the reaction be carried out using 0.01–10.0 mmol, preferably 0.1–5.0 mmol, more preferably 0.2–2.0 mmol, of component [I]-(3) per gram of component [I]-(1), although this ratio differs depending on whether the component [I]-(1) is subjected to a calcining treatment or not or conditions for the calcining treatment if applied.

As to the amount of the compound of the general formula $R^2OH$ to be used, it is desirable to use this compound in an amount of 0.1 to 50 g, preferably 1 to 30 g, per gram of component [I]-(2).

2. Component [II]

Organoaluminum compounds represented by the general formula $Al(OR^3)_pR^4_qX_{3-(p+q)}$ (referred to as [I]-(2)) wherein $R^3$ and $R^4$ are each a hydrocarbon group having 1–24, preferably 1–12, carbon atoms, preferably alkyl, aryl or aralkyl and $R^4$ and $R^5$ may be same or different, X is hydrogen atom or halogen atom such as chlorine, bromine, fluorine or iodine and p and q $0 \leq p<3$, $0 \leq q<3$, provided that $0<p+q<3$.

As the above alkyl these are mentioned methyl, ethyl, propyl, isopropyl, butyl, sec-butyl, tert-butyl, pentyl, octyl and decyl, as the aryl these are mentioned phenyl and tolyl and as the aralkyl these are mentioned benzyl.

Examples of the organoaluminum compounds are dimethylaluminum-methoxide, dimethylaluminumethoxide, dimethylaluminumisopropoxide, dimethylaluminum-tert-butoxide, dimethylaluminum-n-butoxide, dimethylaluminum-sec-butoxide, diethylaluminummethoxide, diethylaluminumethoxide, diethylaluminumisopropoxide, diethylaluminum-tert-butoxide, diethylaluminum-n-butoxide, diethylaluminum-sec-butoxide, dipropylaluminumpropoxide, dipropylaluminum-tert-butoxide, dibutylaluminum-tert-butoxide, diisobutylaluminummethoxide, diisobutylaluminumethoxide, diisobutylaluminumisopropoxide, diisobutylaluminumisobutoxide, diisobutylaluminum-tert-butoxide, di-tert-butylaluminummethoxide, di-tert-butylaluminumethoxide, di-tert-butylaluminum-tert-butoxide, dimethylaluminumphenoxide, di-n-hexylaluminumethoxide, di-n-hexylaluminumisopropoxide, ethylethoxyaluminumchloride, isobutylethoxyaluminumchloride, ethylphenoxyaluminumchloride, phenylethoxyaluminumchloride, ethylethoxyaluminumhydride, ethylmethoxyaluminumchloride, ethylisopropoxyaluminumdichloride, ethylbutoxyaluminumchloride, phenylaluminumdichloride, diphenylaluminumchloride, benzylaluminumdichloride, dibenzylaluminumchloride, dimethylaluminumchloride, diethylaluminumfluoride, diethylaluminumchloride, diethylaluminumbromide, diethylaluminumidodide, diisobutylaluminumchloride, methylaluminumsesquichloride, ethylaluminumsesquichloride, ethylaluminumsesquibromide, methylaluminumdichloride, ethylaluminumdichloride, isobutylaluminumdichloride, trimethylaluminum, triethylaluminum, tri-n-propylaluminum, tri-n-butylaluminum, triisobutylaluminum, tri-n-hexylaluminum, tri-n-octylaluminum, or mixtures thereof. Preferable compounds are those represented by the general formula $AlR^5_nX_{3-n}$ such as diethylaluminumchloride, ethylaluminumsesquichloride, and ethylaluminum dichloride.

3. Component [III]

The silicon compound used in the present invention is a silicon compound having at least one Si—N—C bonding.

As the silicon compound having at least one Si—N—C bonding there are mentioned a silicon compound represented by the general formula $R^5_aR^6_bR^7_cSi(NR^8_2)_dX_{4-(a+b+c+d)}$ wherein $R^5$, $R^6$ and $R^7$ are each hydrogen or a hydrocarbon group having 1–20, preferably 1–12, carbon atoms, such as alkyl, aryl and aralkyl, $R^8$ is a hydrocarbon group having 1–20, preferably 1–12, carbon atoms, such as alkyl, aryl and aralkyl, $R^5$, $R^6$ and $R^7$ may be same or different and when $R^5$, $R^6$ and $R^7$ are hydrocarbon groups, $R^5$, $R^6$, $R^7$ and $R^8$ may be same or different, X is a halogen atom such as chlorine, bromine and iodine, a, b, c and d are $0 \leq a<4$, $0 \leq b<4$, $0 \leq c<4$ and $0<d \leq 4$, provided that $0<a+b+c+d \leq 4$. Examples of these silicon compound are $Si\{N(CH_3)_2\}_4$, $Si\{N(C_2H_5)_2\}_4$, $HSi\{N(CH_3)_2\}_3$, $HSi\{N(C_2H_5)_2\}_3$, $CH_3Si\{N(CH_3)_2\}_3$, $CH_3Si\{N(C_2H_5)_2\}_3$, $C_2H_5Si\{N(CH_3)_2\}_3$, $C_2H_5Si\{N(C_2H_5)_2\}_3$, $C_3H_7Si\{N(CH_3)_2\}_3$, $C_3H_7Si\{N(C_2H_5)_2\}_3$, $C_4H_9Si\{N(CH_3)_2\}_3$, $C_4H_9Si\{N(C_2H_5)_2\}_3$, $C_6H_5Si\{N(CH_3)_2\}_3$, $C_6H_5Si\{N(C_2H_5)_2\}_3$, $C_2H_4Si\{N(CH_3)_2\}_3$, $C_2H_4Si\{N(C_2H_5)_2\}_3$, $Si\{NH(CH_3)\}_4$, $Si\{NH(C_2H_5)\}_4$, $HSi\{NH(CH_3)\}_3$, $HSi\{NH(C_2H_5)\}_3$, $CH_3Si\{NH(CH_3)\}_3$, $CH_3Si\{NH(C_2H_5)\}_3$, $C_2H_5Si\{NH(CH_3)\}_3$, $C_2H_5Si\{NH(C_2H_5)\}_3$, $C_3H_7Si\{NH(CH_3)\}_3$, $C_3H_7Si\{NH(C_2H_5)\}_3$, $C_4H_9Si\{NH(CH_3)\}_3$, $C_4H_9Si\{NH(C_2H_5)\}_3$, $C_6H_5Si\{NH(CH_3)\}_3$, $C_6H_5Si\{NH(C_2H_5)\}_3$, $C_2H_4Si\{NH(CH_3)\}_3$, $C_2H_4Si\{NH(C_2H_5)\}_3$, $H_2Si\{N(CH_3)_2\}_2$, $HCH_3Si\{N(CH_3)_2\}_2$, $HC_2H_5Si\{N(CH_3)_2\}_2$, $(CH_3)_2Si\{N(CH_3)_2\}_2$, $(CH_3)(C_2H_5)Si\{N(CH_3)_2\}_2$, $(CH_3)(C_2H_4)Si\{N(CH_3)_2\}_2$, $(CH_3)(C_6H_5)Si\{N(CH_3)_2\}_2$, $H_2Si\{N(C_2H_5)_2\}_2$, $HCH_3Si\{N(C_2H_5)_2\}_2$, $HC_2H_5Si\{N(C_2H_5)_2\}_2$, $(CH_3)_2Si\{N(C_2H_5)_2\}_2$, $(CH_3)(C_2H_5)Si\{N(C_2H_5)_2\}_2$, $(CH_3)(C_2H_4)Si\{N(C_2H_5)_2\}_2$, $(CH_3)(C_6H_5)Si\{N(C_2H_5)_2\}_2$, $H_2Si\{NH(CH_3)\}_2$, $HCH_3Si\{NH(CH_3)\}_2$, $HC_2H_5Si\{NH(CH_3)\}_2$, $(CH_3)_2\{SiNH(CH_3)\}_2$, $(CH_3)(C_2H_5)Si\{NH(CH_3)\}_2$, $(CH_3)(C_2H_4)Si\{NH(CH_3)\}_2$, $(CH_3)(C_6H_5)Si\{NH(CH_3)\}_2$, $H_2Si\{NH(C_2H_5)\}_2$, $HCH_3Si\{NH(C_2H_5)\}_2$, $HC_2H_5Si\{NH(C_2H_5)\}_2$, $(CH_3)_2\{SiNH(C_2H_5)\}_2$, $(CH_3)(C_2H_5)Si\{NH(C_2H_5)\}_2$, $(CH_3)(C_2H_4)Si\{NH(C_2H_5)\}_2$, $(CH_3)(C_6H_5)Si\{NH(C_2H_5)\}_2$, $H_3SiN(CH_3)_2$, $H_2CH_3SiN(CH_3)_2$, $H_2C_2H_5SiN(CH_3)_2$, $H(CH_3)_2SiN(CH_3)_2$, $H(C_2H_5)_2SiN(CH_3)_2$, $(CH_3)_3SiN(CH_3)_2$, $(CH_3)_2(C_2H_5)SiN(CH_3)_2$, $CH_3(C_2H_5)_2SiN(CH_3)_2$, $H_3SiN(C_2H_5)_2$, $H_2CH_3SiN(C_2H_5)_2$, $H_2C_2H_5SiN(C_2H_5)_2$, $H(CH_3)_2SiN(C_2H_5)_2$, $H(C_2H_5)_2SiN(C_2H_5)_2$, $(CH_3)_3SiN(C_2H_5)_2$, $(CH_3)_2(C_2H_5)SiN(C_2H_5)_2$, $(CH_3)(C_2H_5)_2SiN(C_2H_5)_2$, $H_3SiNH(CH_3)$, $H_2CH_3SiNH(CH_3)$, $H_2C_2H_5SiNH(CH_3)$, $H(CH_3)_2SiNH(CH_3)$, $H(C_2H_5)_2SiNH(CH_3)$, $(CH_3)_3SiNH(CH_3)$, $(CH_3)_2(C_2H_5)SiNH(CH_3)$, $(CH_3)(C_2H_5)_2SiNH(CH_3)$, $H_3SiNH(C_2H_5)$, $H_2CH_3SiNH(C_2H_5)$, $H_2C_2H_5SiNH(C_2H_5)$, $H(CH_3)_2SiNH(C_2H_5)$, $H(C_2H_5)_2SiNH(C_2H_5)$, $(CH_3)_3SiNH(C_2H_5)$, $(CH_3)_2(C_2H_5)SiNH(C_2H_5)$, $((CH_3)(C_2H_5)_2SiNH(C_2H_5)$, $Si\{N(CH_3)_2\}_3Cl$, $Si\{N(C_2H_5)_2\}_3Cl$, $HSi\{N(CH_3)_2\}_2Cl$, $HSi\{N(C_2H_5)_2\}_2Cl$, $CH_3Si\{N(CH_3)_2\}_2Cl$, $CH_3Si\{N(C_2H_5)_2\}_2Cl$, $C_2H_5Si\{N(CH_3)_2\}_2Cl$, $C_2H_5Si\{N(C_2H_5)_2\}_2Cl$, $C_3H_7Si\{N(CH_3)_2\}_2Cl$, $C_3H_7Si\{N(C_2H_5)_2\}_2Cl$, $C_4H_9Si\{N(CH_3)_2\}_2Cl$, $C_4H_9Si\{N(C_2H_5)_2\}_2Cl$, $C_6H_5Si\{N(CH_3)_2\}_2Cl$, $C_6H_5Si\{N(C_2H_5)_2\}_2Cl$, $C_2H_4Si\{N(CH_3)_2\}_2Cl$, $C_2H_4Si\{N(C_2H_5)_2\}_2Cl$, $Si\{NH(CH_3)\}_3Cl$, $Si\{NH(C_2H_5)\}_3Cl$, $HSi\{NH(CH_3)\}_2Cl$, $HSi\{NH(C_2H_5)\}_2Cl$, $CH_3Si\{NH(CH_3)\}_2Cl$, $CH_3Si\{NH(C_2H_5)\}_2Cl$, $C_2H_5Si\{NH(CH_3)\}_2Cl$, $C_2H_5Si\{NH(C_2H_5)\}_2Cl$, $C_3H_7Si\{NH(CH_3)\}_2Cl$, $C_3H_7Si\{NH(C_2H_5)\}_2Cl$, $C_4H_9Si\{NH(CH_3)\}_2Cl$, $C_4H_9Si\{NH(C_2H_5)\}_2Cl$, $C_6H_5Si\{NH(CH_3)\}_2Cl$, $C_6H_5Si\{NH(C_2H_5)\}_2Cl$, $C_2H_4Si\{NH(CH_3)\}_2Cl$, $C_2H_4Si\{NH(C_2H_5)\}_2Cl$, and the like.

Silicon compounds having a cyclic amino group may also be used. Examples are

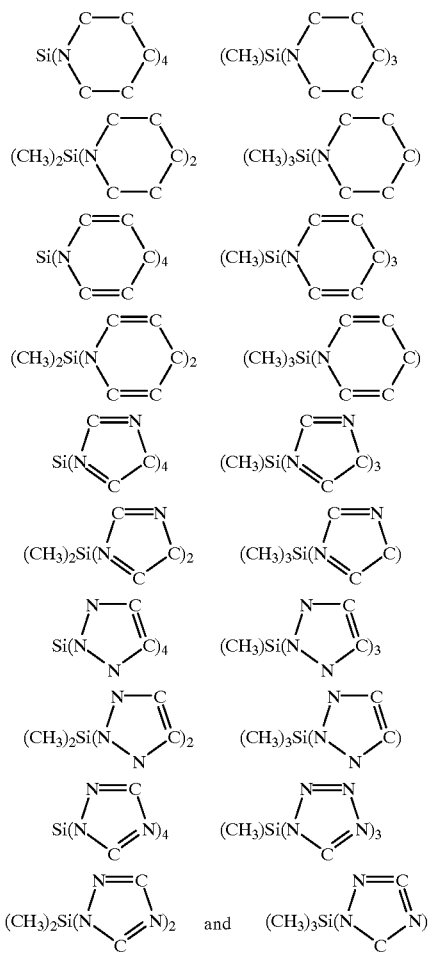

Preferable compounds are Si(OCH$_3$), Si(OC$_2$H$_5$)$_4$, (CH$_3$)$_2$Si(OCH$_3$)$_2$, (C$_2$H$_5$)$_2$Si(OC$_2$H$_5$)$_2$, (CH$_3$)$_2$Si(OC$_2$H$_5$)$_2$, (C$_2$H$_5$)$_2$Si(OCH$_3$)$_2$, (CH$_3$)HSi(OCH$_3$)$_2$, (C$_2$H$_5$)HSi(OCH$_3$)$_2$, (CH$_3$)HSi(OC$_2$H$_5$)$_2$ (C$_2$H$_5$)HSi(OCH$_3$)$_2$ HSi(OCH$_3$)$_3$ HSi(OC$_2$H$_5$)$_3$, HCH$_3$Si{N(CH$_3$)$_2$}$_2$, HCH$_3$Si{N(C$_2$H$_5$)$_2$}$_2$, (CH$_3$)$_2$Si{N(CH$_3$)$_2$}$_2$, and (CH$_3$)$_2$Si{N(C$_2$H$_5$)$_2$}$_2$.

4. Preparation of Solid Catalyst Component

As to in what order the components [I] to [III] are to be reacted for preparing the solid catalyst component used in the present invention, there may be adopted any of the following methods:

(A) Components [I] and [II] are first reacted, followed by reaction with component [III].

(B) Components [I] and [III] are first reacted, followed by reaction with component [II].

(C) The reaction product of components [II] and [III] are reacted with component [I].

(D) Components [I] to [III] are reacted simultaneously.

The reaction method is not specially limited. But according to a preferred method, the components are reacted, preferably mixed and reacted, at a temperature of 0° to 300° C., preferably 20° to 150° C., for 5 minutes to 10 hours, in the presence or absence of an inert hydrocarbon solvent which is inert to conventional Ziegler catalysts, such as, for example, pentane, hexane cyclohexane, heptane, octane, nonane, decane, benzene, toluene or xylene. In the case of performing the reaction in the presence of such an inert hydrocarbon solvent, it is desirable that the solvent be removed by a suitable means such as evaporation after the reaction. of course, when the components [I], [II] and [III] are reacted in steps as in the foregoing methods (A), (B) (C), the reaction is conducted in the presence or absence of an inert hydrocarbon at each of the former and latter stages. For example, there may be adopted any of a method wherein the former-stage reaction is performed in the presence of an inert hydrocarbon solvent, then the solvent is removed and thereafter the latter-stage reaction is conducted, a method wherein after removal of the solvent used in the first-stage reaction, the solvent is newly added and the latter-stage reaction is carried out, a method wherein the latter-stage reaction is conducted without removing the solvent used in the first-stage reaction, and a method wherein without removal of the solvent used in the first-stage reaction, the solvent is newly added and the second-stage reaction is performed.

The reaction ratio of the components [I], [II] and [III] is set as follows. As to component [II], the component [II]/component [I]-(3) mole ratio is in the range from 0.01 to 100, preferably 0.2 to 10, more preferably 0.5 to 5. As to component [III], the component [III]/component [I]-(3) mole ratio is in the range from usually 0.01 to 10, preferably 0.03 to 5.0, more preferably 0.05 to 1.0.

The reaction operations for preparing the solid catalyst component should be performed in an inert gas atmosphere, and moisture should be avoided.

<2>Organometallic Compound

The catalyst used in the present invention comprises the above mentioned solid catalyst component, the above mentioned silicon compound and an organometallic compound.

As the organometallic compound used in the present invention, there may be preferably employed an organometallic compound of a metal of Groups I–IV in the Periodic Table which is known as a component of Ziegler type catalyst. Particularly preferred are organoaluminum compounds and organozinc compounds. To illustrate these organoaluminum compounds, mention may be made of organoaluminum compounds of the general formulae R$_3$Al, R$_2$AlX, RAlX$_2$, R$_2$AlOR, RAl(OR)X and R$_3$Al$_2$X$_3$ wherein R, which may be the same or different, is an alkyl or aryl group having 1 to 20 carbon atoms and X is a halogen atom, as well as organozinc compounds of the general formula R$_2$Zn wherein R, which may be the same or different, is an alkyl group having 1 to 20 carbon atoms. Concrete examples are trimethylaluminum, triethylaluminum, triisopropylaluminum, triisobutylaluminum, tri-sec-butylaluminum, tri-tert-butylaluminum, trihexylaluminum, trioctylaluminum, diethylaluminumchloride, diisopropylaluminumchloride, diethylaluminumethoxide, ethylaluminumsesquichloride, diethylzinc, and mixtures thereof.

The amount of the organic compound is not specially limited but it is preferred to use 0.1–1,000 moles per 1 mole of the titanium compound.

It is also preferable in the present invention that the organometallic compound component be used as a mixture or addition compound of the organometallic compound and an organic acid ester.

Where the organometallic compound component is used as a mixture of the organometallic compound and an organic acid ester, the organic acid ester is used usually in an amount of 0.1 to 1 mole, preferably 0.2 to 0.5 mole, per mole of the organometallic compound. Where it is used as an addition compound of the organometallic compound and the organic acid ester, the molar ratio is preferably in the range of 2:1 to 1:2.

The organic acid ester is the ester of a saturated or unsaturated, mono- or dibasic organic carboxylic acid having 1 to 24 carbon atoms and an alcohol having 1 to 30 carbon atoms. Examples are methyl formate, ethyl acetate, amyl acetate, phenyl acetate, octyl acetate, methyl methacrylate, ethyl stearate, methyl benzoate, ethyl benzoate, n-propyl benzoate, iso-propyl benzoate, butyl benzoate, hexyl benzoate, cyclopentyl benzoate, cyclohexyl benzoate, phenyl benzoate, benzoic acid-4-tolyl, methyl salicylate, ethyl salicylate, methyl p-hydroxybenzoate, ethyl p-hydroxybenzoate, phenyl salicylate, cyclohexyl p-hydroxybenzoate, benzyl salicylate, ethyl α-resorcinol carboxylate methyl anisate, methyl p-ethoxybenzoate, methyl p-toluylate, ethyl p-toluylate, phenyl p-toluylate, ethyl o-toluylate, ethyl m-toluylate, methyl p-aminobenzoate ethyl p-aminobenzoate, vinyl benzoate, allyl benzoate, benzyl benzoate, methyl naphthoate and ethyl naphthoate. Particularly preferred are alkyl esters, especially methyl esters, of benzoic acid, o- or p-toluic acid and anisic acid.

<3>Polymerization of Olefin

The olefin polymerization using the catalyst of the present invention can be performed in the form of slurry polymerization, solution polymerization or vapor phase polymerization. The catalyst used in the present invention is particularly suitable for vapor phase polymerization. The polymerization reaction is carried out in the same way as in the conventional olefin polymerization reaction using a Ziegler type catalyst. More particularly, the reaction is performed in a substantially oxygen- and water-free condition in the presence or absence of an inert hydrocarbon. Olefin polymerizing conditions involve temperatures in the range of 20° to 120° C., preferably 50° to 100° C., and pressures in the range of atmospheric pressure to 70 kg/cm$^2$, preferably 2 to 60 kg/cm$^2$. Adjustment of the molecular weight can be done to some extent by changing polymerization conditions such as the polymerization temperature and the catalyst mole ratio, but the addition of hydrogen into the polymerization system is more effective for this purpose. Of course, using the catalyst of the present invention, there can be performed two or more multi-stage polymerization reactions involving different polymerization conditions such as different hydrogen concentrations and different polymerization temperatures.

The process of the present invention is applicable to the polymreization of all olefins that can be polymerized using a Ziegler type catalyst, preferably α-olefins having 2 to 12 carbon atoms. For Example, it is suitable for the homopolymerization of such α-olefins as ethylene, propylene, 1-butene, 1-hexene and 4-methyl-pentene and the copolymerization of ethylene and an α-olefin having 3–12 carbon atoms such as propylene, 1-butene, 1-hexene and 4-methylpentene-1, the copolymerization of propylene and 1-butene and the copolymerization of ethylene and one or more α-olefins.

Copolymerization with dienes is also preferable for the modification of polyolefins. Examples of diene compounds which may be used for this purpose are butadiene, 1,4-hexadiene, ethylidene norbornene and dicyclopentadiene. The comonomer content in the copolymerization may be selected optionally. For instance, when ethylene and a α-olefin having 3–12 carbon atoms is copolymerized, the α-olefin content in the copolymer is preferably 0–40 molar %, more preferably 0–30 molar %.

EXAMPLES

The following examples are given to further illustrate the present invention and for practising the invention, but it is to be understood that the invention is not limited thereto.

How to Measure Physical Properties of Polymer
Melting Point

Using a differential scanning calorimeter (DSC) (a product of Seiko Denshi K.K.), a polymer sample weighing 5 mg is once melted at 180° C. and then cooled to −40° C., thereafter the temperature corresponding to an endothermic peak top is regarded as the melting point of the polymer.

Hexane Extraction

A copolymer powder is roll-milled at 180° C. and then pressed into a 5 cm×5 cm×0.2 mm sheet, thereafter the sheet is extracted in boiling hexane for 5 hours and the percent reduction in weight is regarded as hexane extraction.

n-value

Using a flow tester (CFT-500)(a product of Shimazu Corp.) a sample is extruded from a die having a diameter of 2.0±0.01 mm and a length of 40.0±0.01 mm under verious loads at 170° C. and a shear rate grade of shear rate to shear stress is calculated using the following equation:

$$n\text{-value} = \frac{\log(\dot{r}_H/\dot{r}_L)}{\log(\tau_H/\tau_L)} = \frac{\log(Q_H/Q_L)}{\log(P_H/P_L)}$$

wherein $\dot{r}_H$: apparent shear rate (sec$^{-1}$) at 150 kgf/cm$^2$ $\dot{r}_L$: apparent shear rate (sec$^{-1}$) at 20 kgf/cm$^2$ $\tau_H$: apparent shear stress (dyne/cm$^2$) 150 kgf/cm$^2$ $\tau_L$: apparent shear stress (dyne/cm$^2$) 20 kgf/cm$^2$ $Q$: flowing value (ml/sec)

$P$: load (kg)

EXAMPLE 1

(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to obtain a reaction product.

A three-necked flask equipped with a stirrer and a reflux condenser was purged with nitrogen and then charged with 100 g of dehydrated 2-methyl-1-pentanol, 5.0 g of the reaction product of anhydrous magnesium chloride and triethoxyaluminum prepared above and 6.0 g of tetra-n-ethoxytitanium, and reaction was allowed to take place at 80° C. for 1 hour. After cooling to room temperature, 46 g of silica which had been calcined at 400° C. for 3 hours was put into the flask and again reaction was allowed to proceed at 80° C. for 2 hours, followed by drying under reduced pressure at 120° C. for 2 hours to afford a solid powder. Then, 100 cc of dehydrated hexane and 6.5 g of diethylaluminum chloride were added and reaction was allowed to proceed at room temperature for 1 hour. Further, 1.1 g of tetrakis (dimethylamino)silane was added and reaction was allowed to proceed at room temperature for 3 hours. Thereafter, the hexane was removed by blowing nitrogen at 60° C. to obtain a solid catalyst component.

(b) Vapor Phase Polymerization

A stainless steel autoclave equipped with a stirrer was used as a vapor-phase polymerization apparatus, and a loop was formed using a blower, a flow control device and a dry type cyclone. The temperature of the autoclave was adjusted by passing warm water through a jacket.

The solid catalyst component prepared above and triethylaluminum were fed at rates of 250 mg/hr and 50 mmol/hr, respectively, into the autoclave held at 80° C. Further, butene-1, ethylene and hydrogen were fed while adjusting the butene-1/ethylene mol ratio in the internal vapor phase of the autoclave to 0.30 and the hydrogen/ethylene mol ratio to 0.1. Polymerization was performed continuously for 10 hours while circulating the gases in the polymerization system using the blower and maintaining the total pressure at 8 kg/cm$_2$G and while withdrawing the resulting polymer intermittently.

The ethylene copolymer thus prepared was a round particulate matter having a melt flow rate (MFR) of 0.93 g/10 min (at 190° C., a load of 2.16 kg, according to ASTM-D1238-65T), a density of 0.9202 g/cm$^3$, a bulk density of 0.47 g/cm$^3$ and an average particle diameter of 740 μm. Catalytic activity was 210,000 g.copolymer/g.Ti and thus extremely high.

After the continuous polymerization for 10 hours, the interior of the autoclave was checked to find that there was no polymre deposition on the inner wall of the autoclave and the stirrer.

N value of this copolymer was 1.42, thus showing an extremely narrow molecular weight distribution. Its melting point and hexane extraction were 121.3° C. and 2.0 wt %, respectively.

EXAMPLE 2

A solid catalyst component was prepared in the same way as in Example 1 except that 1.7 g of bis(dimethylamino) methylsilane was used in place of tetrakis(dimethylamino) silane. Using this solid catalyst component, polymerization was performed in the same manner as in Example 1.

As a result, catalytic activity was as high as 230,000 g.copolymer/g.Ti and there was obtained a round particulate matter having an MFR of 0.83 g/10 min, a density of 0.9205 g/cm$^3$, a bulk density of 0.44 g/cm$^3$ and an average particle diameter of 810 μm. N value was 1.43, showing a narrow molecular weight distribution. Further, melting point and hexane extraction were 121.6° C. and 2.1 wt %, respectively.

EXAMPLE 3

(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to afford a reaction product.

A three-necked flask equipped with a stirrer and a reflux condenser was purged with nitrogen and then charged with 140 cc of dehydrated, denatured ethanol (containing 5 kg of methanol for 200 l of ethanol), 20 g of dehydrated 2-methyl-1-pentanol and 8.0 g of tetraethoxytitanium. After stirring at room temperature for 1 hour, 10.0 g of the reaction product of anhydrous magnesium chloride and triethoxyaluminum prepared above was fed into the flask, and reaction was allowed to take place at 80° C. for 1 hour. After subsequent cooling to room temperature, 46 g of silica which had been calcined at 400° C. for 3 hours was put into the flask and again reaction was allowed to proceed at 80° C. for 2 hours, followed by drying under reduced pressure at 120° C. for 2 hours to obtain a solid powder. Then, 100 cc of dehydrated hexane and 8.5 g of diethylaluminum chloride were added and reaction was allowed to proceed at room temperature for 1 hour. Thereafter, the hexane was removed by blowing nitrogen at 60° C. for 3 hours to give a solid powder. Then, 1.4 g of bis(diethylamino)dimethylsilane was added and reaction was allowed to proceed at room temperature for 3 hours to afford a solid catalyst component.

(b) Vapor Phase Polymerization

Using the solid catalyst component prepared above, polymerization was performed in the same way as in Example 1. As a result, catalytic activity was as high as 230,000 g.copolymer/g.Ti and there was obtained a round particulate matter having an (MFR) of 0.99 g/10 min, a density of 0.9199 g/cm$^3$, a bulk density of 0.45 g/cm$^3$ and an average particle diameter of 820 μm. N value was 1.42, showing a narrow molecular weight distribution. Melting point and hexane extraction were 121.2° C. and 2.3 wt %, respectively.

EXAMPLE 4

(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to afford a reaction product.

A three-necked flask equipped with a stirrer and a reflux condenser was purged with nitrogen and then charged with 100 g of dehydrated 2-methyl-pentanol and 5.0 g of the reaction product of anhydrous magnesium chloride and triethoxyaluminum prepared above. Under stirring at room temperature 8.3 g of titanium tetrachloride was dropwise added into the flask over a 30 minute period and then reaction was allowed to take place at 80° C. for 1 hour. After subsequent cooling to room temperature, 46 g of silica which had been calcined at 400° C. for 3 hours was fed into the flask and again reaction was allowed to proceed at 80° C. for 2 hours, followed by drying under reduced pressure at 120° C. for 2 hours to obtain a solid powder. Next, 100 cc of dehydrated hexane and 10.0 g of diethylaluminum chloride were added and reaction was allowed to to take place at room temperature for 1 hour. Then, 2.2 g of tetrakis (dimethylamino)silane was added and reaction was allowed to proceed at room temperature for 3 hours, followed by blowing of nitrogen at 60° C. for 3 hours, to afford a solid catalyst component.

(b) Vapor Phase Polymerization

Using the solid catalyst component prepared above, polymerization was conducted in the same way as in Example 1. As a result, catalytic activity was as high as 190,000 g.copolymer/g.Ti and there was obtained a round particulate matter having an MFR of 0.91 g/10 min, a density of 0.9210 g/cm$^3$, a bulk density of 0.46 g/cm$^3$ and an average particle diameter of 710 μm. N value was 1.44, showing a narrow molecular weight distribution. Melting point and hexane extraction were 120.9° C. and 2.3 wt %, respectively.

EXAMPLE 5

A solid catalyst component was prepared in the same way as in Example 4 except that 8.7 g of trichloromonoethoxytitanium was used in place of titaniium tetrachloride. Using this solid catalyst component, polymerization was conducted in the same manner as in Example 1.

As a result, catalytic activity was as high as 200,000 g.copolymer/g.Ti and there was obtained a round particulate matter having an MFR of 1.03 g/10 min, a density of 0.9212 g/cm$^3$, a bulk density of 0.46 g/cm$^3$ and an average particle diameter of 720 μm. N value was 1.43, showing a narrow molecular weight distribution. Melting point and hexane extraction were 121.0° C. and 2.2 wt %, respectively.

EXAMPLE 6

(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to afford a reaction product.

A three-necked flask equipped with a stirrer and a reflux condenser was purged with nitrogen and then charged with 140 cc of dehydrated ethanol, 17.0 g of dehydrated 2-ethyl-1-hexanol and 7.8 g of tetrabutoxytitanium. After stirring at room temperature for 1 hour, 7.5 g of the reaction product of anhydrous magnesiium chloride and triethoxyaluminum prepared above was fed into the flask and reaction was allowed to take place at 80° C. for 1 hour. After subsequent cooling to room temperature, 46 g of silica which had been calcined at 400° C. for 3 hours was put into the flask and again reaction was allowed to proceed at 80° C. for 2 hours, followed by drying under reduced pressure at 120° C. for 2 hours to obtain a solid powder. Next, 100 cc of dehydrated hexane and 10.0 g of diethylaluminum chloride were added and reaction was allowed to to take place at room temperature for 1 hour. Thereafter, the hexane was removed by blowing nitrogen at 60° C. for 3 hours to give a solid powder. Then, 0.9 g of tetrakis(dimethylamino)silane was added and reaction was allowed to proceed at room temperature for 3 hours to afford a solid catalyst component.

(b) Vapor Phase Polymerization

Using the solid catalyst component prepared above, polymerization was carried out in the same way as in Example 1. As a result, catalytic activity was as high as 230,000 g.copolymer/g.Ti and there was obtained a round particulate matter having an MFR of 0.90 g/10 min, a density of 0.9201 g/cm$^3$, a bulk density of 0.47 g/cm$^3$ and an average particle diameter of 790 μm. N value was 1.42, showing a narrow molecular weight distribution. Melting point and hexane extraction were 120.5° C. and 1.9 wt %, respectively.

EXAMPLE 7

A solid catalyst component was prepared in the same way as in Example 6 except that 0.8 g of bis(dimethylamino) methylsilane was used in place of tetrakis(dimethylamino) silane. Using this solid catalyst component, polymerization was conducted in the same manner as in Example 1.

As a result, catalytic activity was as high as 260,000 g.copolymer/g.Ti and there was obtained a round particulate matter having an MFR of 0.86 g/10 min, a density of 0.9211 g/cm$^3$, a bulk density of 0.46 g/cm$^3$ and an average particle diameter of 830 μm. N value was 1.41, showing an extremely narrow molecular weight distribution. Melting point and hexane extraction were 121.5° C. and 2.4 wt %, respectively.

EXAMPLE 8

(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to afford a reaction product.

A three-necked flask equipped with a stirrer and a reflux condenser was purged with nitrogen and then charged with 140 cc of dehydrated ethanol, 17.0 g of dehydrated 2-ethyl-1-hexanol and 7.8 g of tetrabutoxytitanium. After stirring at room temperature for 1 hour, 7.5 g of the reaction product of anhydrous magnesiium chloride and triethoxyaluminum prepared above was fed into the flask and reaction was allowed to take place at 80° C. for 1 hour. After subsequent cooling to room temperature, 46 g of silica which had been calcined at 400° C. for 3 hours was put into the flask and again reaction was allowed to proceed at 80° C. for 2 hours, followed by drying under reduced pressure at 120° C. for 2 hours to obtain a solid powder. Next, 100 cc of dehydrated hexane and 10.0 g of diethylaluminum chloride were added and reaction was allowed to proceed at room temperature for 1 hour. Subsequently, 0.8 g of bis(dimethylamino) dimethylsilane was added and reaction was allowed to proceed at 60° C. for 3 hours. Thereafter, the hexane was removed by blowing nitrogen at 60° C. for 3 hours to give a solid catalyst component.

(b) Vapor Phase Polymerization

Using the solid catalyst component prepared above, polymerization was carried out in the same way as in Example 1. As a result, catalytic activity was as high as 240,000 g.copolymer/g.Ti and there was obtained a round particulate matter having an MFR of 0.87 g/10 min, a density of 0.9199 g/cm$^3$, a bulk density of 0.47 g/cm$^3$ and an average particle diameter of 790 μm. N value was 1.42, indicating a narrow molecular weight distribution. Melting point and hexane extraction were 120.8° C. and 1.9 wt %, respectively.

EXAMPLE 9

(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to afford a reaction product.

A three-necked flask equipped with a stirrer and a reflux condenser was purged with nitrogen and then charged with 140 cc of dehydrated, denatured ethanol, (containing 5 kg of methanol for 200 l of ethanol), 17.0 g of dehydrated 2-ethyl-1-hexanol and 15.0 g of tetrabutoxytitanium. After stirring at room temperature for 1 hour, 7.5 g of the reaction product of anhydrous magnesium chloride and triethoxyaluminum was added and reaction was allowed to take place at 80° C. for 1 hour. After subsequent cooling to room temperature, 46 g of silica which had been calcined at 400° C. for 3 hours was put into the flask and again reaction was allowed to proceed at 80° C. for 2 hours, followed by drying under reduced pressure at 120° C. for 2 hours to give a solid powder. Next, 100 cc of dehydrated hexane and 1.5 g of bis (dimethylamino)dimethylsilane was added and reaction was allowed to proceed at room temperature for 3 hours. Subsequently, 10.0 g of diethylaluminum chloride were added and reaction was allowed to proceed at room temperature for 1 hour. Thereafter, the hexane was removed by blowing nitrogen at 60° C. for 3 hours to afford a solid catalyst component.

(b) Vapor Phase Polymerization

Using the solid catalyst component prepared above, polymerization was conducted in the same way as in Example 1. As a result, catalytic activity was as high as 230,000 g.copolymer/g.Ti and there was obtained a round particulate matter having an MFR of 0.91 g/10 min, a density of 0.9204 g/cm$^3$, a bulk density of 0.45 g/cm$^3$ and an average particle diameter of 770 μm. N value was 1.42, indicating a narrow molecular weight distribution. Melting point and hexane extraction were 120.8° C. and 2.1 wt %, respectively.

EXAMPLE 10

A solid catalyst component was prepared in the same way as in Example 1 except that 10 g of ethylethoxyaluminum chloride was used in place of diethylaluminum chloride. Using this solid catalyst component, polymerization was performed in the same manner as in Example 1.

As a result, catalytic activity was as high as 190,000 g.copolymer/g.Ti and there was obtained a round particulate matter having an MFR of 0.69 g/10 min, a density of 0.9224 g/cm$^3$, a bulk density of 0.44 g/cm$^3$ and an average particle diameter of 660 μm. N value was 1.42, indicating a narrow molecular weight distribution. Melting point and hexane extraction were 121.7° C. and 2.0 wt %, respectively.

EXAMPLE 11

A solid catalyst component was prepared in the same way as in Example 1 except that 3.6 g of triethoxyboron was used instead of triethoxyaluminum. Using this solid catalyst component, polymerization was conducted in the same manner as in Example 1.

As a result, catalytic activity was as high as 230,000 g.copolymer/g.Ti and there was obtained a round particulate matter having an MFR of 1.04 g/10 min, a density of 0.9200 g/cm$^3$, a bulk density of 0.45 g/cm$^3$ and an average particle diameter of 780 μm. N value was 1.41, indicating a narrow molecular weight distribution. Melting point and hexane extraction were 120.9° C. and 2.5 wt %, respectively.

EXAMPLE 12

A solid catalyst component was prepared in the same way as in Example 1 except that 2.9 g of diethoxymagnesium was used instead of triethoxyaluminum. Using this solid catalyst component, polymerization was performed in the same manner as in Example 1.

As a result, catalytic activity was as high as 240,000 g.copolymer/g.Ti and there was obtained a round particulate matter having an MFR of 0.86 g/10 min, a density of 0.9207 g/cm$^3$, a bulk density of 0.43 g/cm$^3$ and an average particle diameter of 780 μm. N value was 1.43, indicating a narrow molecular weight distribution. Melting point and hexane extraction were 121.3° C. and 2.3 wt %, respectively.

EXAMPLE 13

A solid catalyst component was prepared in the same way as in Example 1 except that alumina was used instead of silica. Using this solid catalyst component, polymerization was carried out in the same manner as in Example 1.

As a result, catalytic activity was as high as 190,000 g.copolymer/g.Ti and there was obtained a round particulate matter having an MFR of 0.94 g/10 min, a density of 0.9225 g/cm$^3$, a bulk density of 0.44 g/cm$^3$ and an average particle diameter of 630 μm. N value was 1.43, indicating a narrow molecular weight distribution. Melting point and hexane extraction were 121.5° C. and 2.3 wt %, respectively.

EXAMPLE 14

A solid catalyst component was prepared in the same way as in Example 1 except that silica-alumina was used instead of silica. Using this solid catalyst component, polymerization was performed in the same manner as in Example 1.

As a result, catalytic activity was as high as 170,000 g.copolymer/g.Ti and there was obtained a round particulate matter having an MFR of 0.98 g/10 min, a density of 0.9232 g/cm$^3$, a bulk density of 0.46 g/cm$^3$ and an average particle diameter of 530 μm. N value was 1.44, indicating a narrow molecular weight distribution. Melting point and hexane extraction were 122.1° C. and 2.2 wt %, respectively.

COMPARATIVE EXAMPLE 1

(a) Preparation of Solid Catalyst Component 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to afford a reaction product.

A three-necked flask equipped with a stirrer and a reflux condenser was purged with nitrogen and then charged with 100 g of dehydrated 2-methyl-1-pentanol, 5.0 g of the reaction product of anhydrous magnesium chloride and triethoxyaluminum prepared above and 10 g of tetra-n-ethoxytitanium, and reaction was allowed to take place at 80° C. for 1 hour. After cooling to room temperature, 46 g of silica which had been calcined at 400° C. for 3 hours was placed in the flask and again reaction was allowed to proceed at 80° C. for 2 hours, followed by drying under reduced pressure at 120° C. for 2 hours to give a solid powder. Next, 100 cc of dehydrated hexane and 10.0 g of diethylaluminum chloride was added and reaction was allowed to proceed at room temperature for 1 hours. Thereafter, the hexane was removed by blowing nitrogen at 60° C. for 3 hours, leaving a solid catalyst component.

(b) Vapor Phase Polymerization

Using the solid catalyst component prepared above, polymerization was conducted in the same way as in Example 1. As a result, catalytic activity was as high as 240,000 g.copolymer/g.Ti and there was obtained a particulate matter having an MFR of 1.02 g/10 min, a density of 0.9205 g/cm$^3$, a bulk density of 0.45 g/cm$^3$ and an average particle diameter of 830 μm and a N value of 1.48. Melting point and hexane extraction were 121.6° C. and 2.7 wt %, respectively. Thus, the polymer obtained by using the solid catalyst component not containing a silicate compound was large in both FR value and hexane extraction.

An olefin homopolymer or copolymer prepared in the presence of a catalyst comprising the solid catalyst component described above and an organometallic compound according to the present invention possesses an extremely high bulk density, a relatively large average particle diameter, a narrrow particle size distribution and a reduced proportion of a finely divided powder. Consequently, there is little deposition of polymer on the reactor wall during polymerization, thus permitting stable operation, and the generation of dust can be prevented during molding, whereby not only the molding efficiency can be enhanced but also the pelletizing step can be omitted.

Further, since the molecular weight distribution of the polymer is narrow, when film is formed using the polymer, it can exhibit various effects such as, for example, high strength, high transparency, and superior anti-blocking property and heat-sealability.

What is claimed is:

1. In a process of preparing a polyolefin by polymerizing ethylene or ethylene and an α-olefin having 3 to 12 carbon atoms in the presence of a catalyst comprising a solid catalyst component and an organometallic compound, said solid catalyst component being prepared by the reaction of the following components I and II:

I a reaction product obtained by reacting the following components (1),(2) and (3) with one another in the presence of a compound represented by the general formula R$^2$OH where R$^2$ is a hydrocarbon group having 1 to 20 carbon atoms:

(1) a silicon oxide and/or aluminum oxide
   (2) a reaction product obtained by the reaction of a magnesium halide and a compound represented by the general formula Me(OR)$_n$X$_{z-n}$ where Me represents an element of Groups I to IV in the Periodic Table, z represents the valence of the element Me, n is $0<n\leq z$, X is a halogen atom and R is a hydrocarbon group having 1 to 20 carbon atoms, and
(3) a titanium compound represented by the general formula $Ti(OR^1)_m X_{4-m}$; where $R^1$ is a hydrocarbon group having 1 to 20 carbon atoms, X is a halogen atom and m is $0\leq m\leq 4$;

II an organoaluminum compound represented by the general formula $Al(OR^3)_p R^4_q X_{3-(p+q)}$ where $R^3$ and $R^4$, which may be the same or different, are each independently a hydrocarbon group having 1 to 24 carbon atoms, X is a halogen atom or a hydrogen atom, p and q are $0\leq p<3$ and $0\leq q\leq 3$, respectively, provided $0<p+q\leq 3$, the improvement comprising reacting III a silicon compound having at least one Si—N—C bond with the reaction product obtained by reacting components I and II to form the solid catalyst component.

2. A process according to claim 1, wherein Me and R in the general formula $Me(OR)_n X_{z-n}$ are an element of Groups I to III or IV b in the Periodic Table and alkyl, aryl, or aralkyl having 1–8 carbon atoms, respectively.

3. A process according to claim 1, wherein $R^2$ in the general formula $R^2OH$ is alkyl, alkenyl, aryl or aralkyl.

4. A process according to claim 1, wherein the ratio of the compound of the general formula $Me(OR)_n X_{z-n}$ to the Magnesium halide is in the range of 0.01 to 10 in terms of Me/Mg (molar ratio).

5. A process according to claim 1, wherein the ratio of components [I]-(1) and [I]-(2) corresponds to 0.01 to 20 mmol of Mg in component [I]-(1).

6. A process according to claim 1, wherein the ratio of components [I]-(1) and [I]-(3) corresponds to 0.01 to 10 mmol of component [I]-(3) per gram of component [I]-(1).

7. A process according to claim 1, wherein the amount of the compound of the general formula $R^2OH$ is 0.1 to 50 g per gram of component [I]-(2).

8. A process according to claim 1, wherein the ratio of component [II]/component [I]-(3) (molar ratio) is 0.01–100.

9. A process according to claim 1, wherein the silicon compound having at least one Si—N—C bonding is a silicon compound represented by the general formula $R^5_a R^6_b R^7_c Si(NR^8_2)_d X_{4-(a+b+c+d)}$ wherein $R^5$, $R^6$ and $R^7$ are each hydrogen or a hydrocarbon group having 1–20, $R^8$ is a hydrocarbon group having 1–20, X is a halogen atom, a, b, c and d are $0\leq a<4$, $0\leq b<4$, $0\leq c<4$ and $0<d\leq 4$, provided that $0<a+b+c+c\leq 4$.

10. A process according to claim 1, wherein the amount of component [III] is in the range of 0.01 to 10 in terms of component [III]/{component [I]-(3) in component [I]} (molar ratio).

11. A process according to claim 1, wherein the organometallic compound is an organoaluminum compound.

12. A process of claim 11 wherein the organometallic compound is used together with an organic acid ester.

13. A process of claim 1 wherein the polymerization reaction is conducted at a temperature of 20° C. to 120° C. and a pressure of atmospheric pressure to 70 kg/cm².

14. A process according to claim 1, wherein the α-olefin content in said polyolefin is up to 40 molar percent.

15. A process of preparing a polyolefin by polymerizing ethylene or ethylene and an α-olefin having 3 to 12 carbon atoms in the presence of a catalyst comprising a solid catalyst component and an organometallic compound, said solid catalyst component being prepared by reacting the following components I, II and III with one another:

I a reaction product obtained by reacting the following components (1), (2) and (3) with one another in the presence of a compound represented by the general formula $R^2OH$ where $R^2$ is a hydrocarbon group having 1 to 20 carbon atoms:
(1) a silicon oxide and/or an aluminum oxide
(2) a reaction product obtained by the reaction of a magnesium halide and a compound represented by the general formula $Me(OR)_n X_{z-n}$ where Me represents an element of Groups I to IV in the Periodic Table, z represents the valence of the element Me, n is $0<n\leq z$, X is a halogen atom and R is a hydrocarbon group having 1 to 20 carbon atoms, and
(3) a titanium compound represented by the general formula $Ti(OR^1)_m X_{4-m}$; where $R^1$ is a hydrocarbon group having 1 to 20 carbon atoms, X is a halogen atom and m is $0\leq m\leq 4$;

II an organoaluminum compound represented by the general formula $Al(OR^3)_p R^4_q X_{3-(p+q)}$ where $R^3$ and $R^4$, which may be the same or different, are each independently a hydrocarbon group having 1 to 24 carbon atoms, X is a halogen atom or a hydrogen atom, p and q are $0\leq p<3$ and $0\leq q\leq 3$, respectively, provided $0<p+q\leq 3$; and III a silicon compound selected from the group consisting of bis(dimethyl amino)methylsilane, bis(diethyl amino) dimethylsilane, bis(dimethyl amino)dimethylsilane and tetrakis(dimethyl amino)silane.

16. A process according to claim 15, wherein said solid catalyst component is a reaction product obtained by reacting the components [I], [II] and [III] simultaneously.

17. A process according to claim 15, wherein said solid catalyst component is a reaction product obtained by the reaction of the components [I] and [II] and subsequent reaction of the resulting reaction product with the component [III].

18. A process according to claim 15, wherein said solid catalyst component is a reaction product obtained by the reaction of the components [I] and [III] and subsequent reaction of the resulting reaction product with the component [II].

19. A process according to claim 15, wherein said solid catalyst component is a reaction product obtained by reacting the component [I] with the reaction product of the components [II] and [III].

20. In a process of preparing an ethylene homopolymer by polymerizing ethylene in the presence of a catalyst comprising a solid catalyst component and an organometallic compound, said solid catalyst component being prepared by the reaction of the following components I and II:

I. a reaction product obtained by reacting the following components (1),(2) and (3) with one another in the presence of a compound represented by the general formula $R^2OH$ where $R^2$ is a hydrocarbon group having 1 to 20 carbon atoms:
(1) a silicon oxide and/or aluminum oxide
(2) a reaction product obtained by the reaction of a magnesium halide and a compound represented by the general formula $Me(OR)_n X_{z-n}$ where Me represents an element of Groups I to IV in the Periodic Table, z represents the valence of the element Me, n is $0<n\leq z$, X is a halogen atom and R is a hydrocarbon group having 1 to 20 carbon atoms, and
(3) a titanium compound represented by the general formula $Ti(OR^1)_m X_{4-m}$; where $R^1$ is a hydrocarbon group having 1 to 20 carbon atoms, X is a halogen atom and m is $0\leq m\leq 4$;

II. an organoaluminum compound represented by the general formula $Al(OR^3)_p R^4_q X_{3-(p+q)}$ where $R^3$ and $R^4$, which may be the same or different, are each independently a hydrocarbon group having 1 to 24 carbon atoms, X is a halogen atom or a hydrogen atom, p and q are $0 \leq p < 3$ and $0 \leq q \leq 3$, respectively, provided $0 < p+q \leq 3$, the improvement comprising reacting III. a silicon compound having at least one Si—N—C bond, said silicon compound being selected from the group consisting of tetrakis (dimethylamino) silane, bis (dimethylamino) methyl silane and bis (dimethylamino) dimethyl silane with the reaction product obtained by reacting components I and II to form the solid catalyst component.

21. The process of claim 20 wherein the compound represented by the general formula $Me(OR)_n X_{z-n}$ is selected from the group consisting of aluminum triethoxide, triethoxyboron and diethoxymagnesium.

22. The process of claim 20 wherein the titanium compound represented by the general formula $Ti(OR^1)_m X_{4-m}$ is selected from the group consisting of titanium tetraethoxide, titanium tetrachloride, trichloromonoethoxytitanium and tetrabutoxytitanium.

23. The process of claim 20 wherein the organoaluminum compound represented by the general formula $Al(OR^3)_p R^4_q X_{3-(p+q)}$ is selected from the group consisting of ethylethoxyaluminum chloride and diethylaluminum chloride.

24. The process of claim 20 wherein the compound represented by the general formula $Me(OR)_n X_{z-n}$ is selected from the group consisting of aluminum triethoxide, triethoxyboron and diethyoxymagnesium, the titanium compound represented by the general formula $Ti(OR^1)_m X_{4-m}$ is selected from the group consisting of titanium tetraethoxide, titanium tetrachloride, trichloromonoethoxytitanium and tetrabutoxytitanium and the organoaluminum compound represented by the general formula $Al(OR^3)_p R^4_q X_{3-(p+q)}$ is selected from the group consisting of ethylethoxyaluminum chloride and diethylaluminum chloride.

\* \* \* \* \*